Patented Jan. 9, 1945

2,366,769

UNITED STATES PATENT OFFICE 2,366,769

VERMICULITE BONDED PRODUCT AND PROCESS OF MAKING THE SAME

Lyle J. Casmire, Los Angeles, Calif., assignor to Margaret D. Schirm, Los Angeles, Calif.

No Drawing. Application December 26, 1941, Serial No. 424,540

3 Claims. (Cl. 106—122)

Vermiculite is a term applied to a well-known natural product or to a group of natural products known as micaceous minerals which generally are alteration products of mica. It has a pronounced characteristic of great expansion by heating in which the scales expand in one direction at right angles to the cleavage. During this expansion the volume increases up to sixteen times the original mass and the specific gravity correspondingly grows less. At the same time the color changes according to the degree of heat and the exposure to the air. The expanded product has been found to be an excellent insulator against heat or cold and a deadener of sound.

The expanded product is known as exfoliated vermiculite and is treated to a certain process in combination with other bonding elements for the purpose of making certain products hereinafter described.

An object of the invention is to provide an inorganic binder for exfoliated vermiculite particles in which the vermiculite itself is made to act as an element of the binding agent, creating thereby a highly adhesive binding material that will be substantially unaffected by heat and non-reacting to the conductivity of heat up to any temperature below the disintegration of the vermiculite particles.

Heretofore bonding materials for exfoliated vermiculite products have been composed of organic substances such as resins, gums, fibers, pulps, etc., which, because they are organic, have a limited temperature range of usefulness. Other binders heretofore used consist of inorganic materials, such as bentonite, sodium silicate, cements, etc. which materially adulterate the product, thereby causing it to lose color and full efficiency.

I have discovered that a basic change can be made in such colloidal materials as bentonite, magnesium silicate, mono-salts, etc., whereby they lose their weight or specific gravity and discoloring properties and take on additional bonding strength when used with non-dissolving surfaces and their integrating separate fragments, and that they change their structure in so doing.

The method of combining the fragments of non-dissolving surfaces with the colloidal agent consists in agitating the agent and particles for a long period of time in an aqueous solution to which an oleoresin has been added. After much violent agitation the mass forms into a viscous emulsion or a reactionary product, leaving the non-dissolving particles held in suspension in the emulsion. The emulsion is a quick-drying bonding material. Exfoliated vermiculite may then be added to form a dough-like mass and the mass can then be moulded into shape that will air dry or can be furnace dried. The product so created has every resemblance of all exfoliated vermiculite material in color, in weight and in all essential properties thereby creating a new article of manufacture, which by test has been found in appearance, conductivity, weight and high-burning point equal to 100% exfoliated vermiculite.

Tests also show that water-proofing materials such as asphaltum may be added to the emulsion without any injury to the foregoing properties, thereby creating a cork-like article with valuable properties for cold storage and insulation.

In carrying out the process which forms part of my invention I take 150 pounds of exfoliated vermiculite in medium size particles and put it in a mixing tank. I add 26 pounds of colloidal magnesium silicate, or any other colloidal agent such as bentonite or mono-salts and 100 gallons of water. The mixer is then started and allowed to run for approximately one hour, at which time, colloidal action will have taken place and the mass will resemble brown jelly. I then add one gallon of spirits of turpentine, and allow the mixture to agitate as violently as possible for approximately four hours. The time element in this mixture is an important factor. Although I have found that the emulsion will form before four hours have passed, it does not seem to reach its proper consistency and efficiency until then, nor will further agitation add to its properties. In order to change the crystalloid aqueous solution to a resinous structure the agitation must be continued until it induces a union which results in a resinoid emulsion. This emulsion is a spongelike colloidal mass that holds the unbroken particles of vermiculite in suspension. It readily takes on more exfoliated vermiculite until it can be handled in the manner of flour dough. Various amounts and sizes of exfoliated vermiculite added to the emulsion regulates the density and bonded strength of the finished article. I have found that one (1) pound of large flake exfoliated vermiculite added to four (4) pounds of the emulsion makes a smooth molding material which resembles cork when dry. The molded material dries readily in a firm texture if placed in the air for 48 hours, or it can be oven dried in 8 hours at 300 degrees, F. After the material is dried the bonding properties of the emulsion increases under the duress of additional heat. I have found that up to 1800 degrees F. its tensile strength is made much greater, the material lighter and the bonding unaffected. Additional bonding agents such as sodium silicate, glue, liquid rubber, etc., may be added to the emulsion to create a desired composition, without ill effect upon the bonding properties of the emulsion.

By this process and use of the foregoing materials a product or composition of matter can be produced from which a great variety of articles of manufacture can be made, such as pipe covering, slabs, brick, panels, etc., and these can be stamped out on a press or moulded by hand to exact dimensions without the need of trimming or boring and without any treatment by the use of salts or acids, etc. It is also true that instead of exfoliated vermiculite such raw material as asbestos, mineral wool, magnesia, etc. or a combination of them may be used in the foregoing process.

I claim:

1. The process of combining exfoliated vermiculite in medium sized particles with a colloidal agent, selected from the class consisting of bentonite and colloidal magnesium silicate, and water and mixing them for a definite period of time until the resulting mass resembles a brown jelly and thereafter adding spirits of turpentine and agitating the combination for a long period of time until resinoid emulsion is formed, and thereafter adding more exfoliated vermiculite until the product can be handled in the manner of flour dough and moulded into articles.

2. The process of combining exfoliated vermiculite in particles with a colloidal agent selected from the class consisting of bentonite and colloidal magnesium silicate and water and mixing them until the resulting mass resembles a brown jelly and thereafter adding spirits of turpentine until a resinoid emulsion is formed, and thereafter after prolonged agitation adding more exfoliated vermiculite until the product can be handled in the manner of flour dough and moulded into articles, after which it is air dried or oven dried.

3. The process of combining exfoliated vermiculite in particles with a colloidal agent selected from the class consisting of bentonite and colloidal magnesium silicate and water and mixing them for about an hour until the resulting mass resembles a brown jelly, and thereafter adding spirits of turpentine and agitating the combination about four hours until a resinoid emulsion is formed and thereafter adding more exfoliated vermiculite until the product can be handled like flour dough and then moulded into articles after which it is dried.

LYLE J. CASMIRE.